United States Patent
Wang et al.

(10) Patent No.: US 8,960,812 B2
(45) Date of Patent: Feb. 24, 2015

(54) ELECTRICAL RETARDING DERATION

(75) Inventors: Jian Wang, Ann Arbor, MI (US);
Bradley Bailey, Peoria, IL (US); Joanne Borchert, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 627 days.

(21) Appl. No.: 13/289,091

(22) Filed: Nov. 4, 2011

(65) Prior Publication Data
US 2012/0132490 A1   May 31, 2012

Related U.S. Application Data

(60) Provisional application No. 61/418,229, filed on Nov. 30, 2010.

(51) Int. Cl.
*B60T 15/14*   (2006.01)
*B60L 11/08*   (2006.01)
*B60L 7/06*   (2006.01)
*B60L 7/08*   (2006.01)

(52) U.S. Cl.
CPC . *B60L 11/08* (2013.01); *B60L 7/06* (2013.01); *B60L 7/08* (2013.01); *B60L 2210/30* (2013.01); *B60L 2210/40* (2013.01); *B60L 2240/12* (2013.01); *B60L 2240/36* (2013.01); *B60L 2240/66* (2013.01); *B60L 2260/28* (2013.01); *Y02T 10/7077* (2013.01); *Y02T 10/7241* (2013.01); *Y02T 10/7291* (2013.01); *Y02T 90/16* (2013.01)

USPC .............................. 303/20; 188/156; 318/472

(58) Field of Classification Search
USPC .......... 188/156, 159, 158; 318/380, 471, 472; 701/70–72; 303/20
See application file for complete search history.

(56) References Cited

U.S. PATENT DOCUMENTS

| | | | | |
|---|---|---|---|---|
| 4,654,627 | A * | 3/1987 | Harkness | 338/319 |
| 4,952,856 | A * | 8/1990 | Schmitz | 318/471 |
| 6,986,727 | B2 * | 1/2006 | Kuras et al. | 477/4 |
| 2005/0028546 | A1 | 2/2005 | Young et al. | |
| 2008/0236919 | A1 | 10/2008 | Iund | |
| 2009/0210125 | A1 | 8/2009 | Dessirier | |
| 2010/0065355 | A1 | 3/2010 | Reddy | |
| 2010/0066280 | A1 * | 3/2010 | Marchand et al. | 318/380 |
| 2010/0066292 | A1 * | 3/2010 | Gottemoller et al. | 318/472 |
| 2012/0062155 | A1 * | 3/2012 | Wang et al. | 318/380 |

* cited by examiner

*Primary Examiner* — Christopher Schwartz
(74) *Attorney, Agent, or Firm* — Miller, Matthias & Hull

(57) ABSTRACT

A method of derating a retarding grid assembly of a machine is provided. The method may determine the temperatures of resistive elements and insulators associated with the retarding grid assembly, generate a trigger if any one of the temperatures of the resistive elements and insulators exceeds a respective temperature threshold, and determine a magnitude of deration to be applied to a drivetrain associated with the machine in response to the trigger. The magnitude of deration may be based at least partially on feedback and feedforward analyzes of the temperatures of the resistive elements and insulators. The magnitude of deration may correspond to a reduction in retarding capacity of the drivetrain.

20 Claims, 4 Drawing Sheets

ELECTRICAL RETARDING DERATION

CROSS-REFERENCE TO RELATED APPLICATION

This is a non-provisional U.S. patent application, which claims priority under 35 U.S.C. §119(e) to U.S. Provisional Patent Application Ser. No. 61/418,229, filed on Nov. 30, 2010, the entirety of which is incorporated by reference herein.

TECHNICAL FIELD

The present disclosure relates generally to electric drive assemblies and machines, and more particularly, to deration strategies for limiting power to retarding grids of electric drive assemblies and machines.

BACKGROUND

The electric drive assembly of a machine typically provides a primary power source, such as an internal combustion engine, or the like, a generator, a power circuit and one or more traction motors coupled to one or more drive wheels or traction devices. When the machine is propelled, mechanical power produced by the primary power source, or engine, is converted to electrical power at the generator. This electrical power is often processed and/or conditioned by the power circuit before being supplied to the traction motors. Moreover, the power circuit selectively activates the traction motors at a desired torque so as to cause movement of the drive wheels. The traction motors transform the electrical power back into mechanical power in order to drive the wheels and propel the electric drive machine or vehicle.

The machine is retarded in a mode of operation during which the operator desires to decelerate the electric drive machine. To retard the machine in this mode, power from the primary power source or engine is reduced. Typical machines also include brakes and other types of retarding mechanisms to decelerate and/or stop the machine. As the machine decelerates, the momentum of the machine is transferred to the traction motors via rotation of the drive wheels. The traction motors act as generators to convert the kinetic energy of the machine into electrical power that is supplied to the electric drive assembly. This electrical energy can be dissipated through storage, waste, or any other form of consumption by the electric drive assembly in order to absorb the machine's kinetic energy. Currently existing electric drive machines or vehicles commonly employ at least a retarding grid assembly through which large amounts of kinetic energy is dissipated in the form of heat.

A typical electrical retarding grid assembly includes a series of resistive elements and insulators through which thermal energy is dissipated while electrical current passes therethrough. Due to the size of machine components and the magnitude of the momentum being retarded, large amounts of thermal energy may be dissipated through the resistive elements and insulators. Such magnitudes of thermal energy can significantly elevate the temperatures of the resistive elements and insulators of the associated retarding grids, and if it is not appropriately managed, can be detrimental to the overall operation of the associated electric drive machine.

Various solutions in the past have employed active cooling systems, such as forced convection by use of a fan or blower, to create airflow over the resistive elements and insulators of retarding grids and reduce the temperatures thereof. While such active cooling systems can compensate for temperature changes in the resistive elements of retarding grids, such systems cannot fully account for temperature changes in the insulators of retarding grids. More specifically, the insulators of a retarding grid are susceptible to hotspots or uneven distribution of temperatures, as well as overshoot conditions or sudden increases in temperature upon blower shut off. The temperatures of insulators which result from such hotspots and overshoot conditions can greatly exceed allowed thresholds and still be undetected by currently existing cooling solutions.

Accordingly, there is a need to provide a more robust and reliable means for minimizing overheating conditions of retarding grids associated with electric drive machines without relying solely on passive and/or active cooling solutions. Moreover, there is a need to preemptively limit the energy that is passed onto the resistive elements and insulators of retarding grids. The disclosed systems and methods are directed at addressing one or more of the needs set forth above.

SUMMARY OF THE DISCLOSURE

In one aspect of the present disclosure, a method of derating a retarding grid of a machine is provided. The method determines the temperatures of the resistive elements and insulators associated with the retarding grid, generates a trigger if any one of the temperatures of the resistive elements and insulators exceeds a respective temperature threshold, and determines a magnitude of deration to be applied to a drivetrain associated with the machine in response to the trigger. The magnitude of deration is based at least partially on feedback and feedforward analyses of the temperatures of the resistive elements and insulators. The magnitude of deration corresponds to a reduction in the retarding capacity of the drivetrain.

In another aspect of the disclosure, a method of derating a retarding grid of a machine is provided. The method determines temperatures of resistive elements and insulators associated with the retarding grid, generates a trigger if any one of the temperatures of the resistive elements and insulators exceeds a respective temperature threshold, determines a power deration term in response to the trigger, determines a power limit term in response to the trigger, and determines a deration factor based on the power deration and power limit terms. The power deration term is based at least partially on feedback analysis of the temperatures of the resistive elements and insulators. The power limit term is based at least partially on feedforward analysis of the temperatures of the resistive elements and insulators. The deration factor corresponds to a reduction in the retarding capacity of a drivetrain associated with the machine.

In yet another aspect of the disclosure, an electrical retarding deration system for a machine having at least a retarding grid and a drivetrain is provided. The deration system includes an inverter circuit configured to communicate power between the drivetrain and the retarding grid, and a controller electrically coupled to the inverter circuit. The controller is configured to adjust a magnitude of the power communicated to the retarding grid based on the temperatures of the resistive elements and insulators of the retarding grid. The controller generates a trigger if any one of the temperatures of the resistive elements and insulators exceeds a respective temperature threshold, and determines a magnitude of deration to be applied to the drivetrain in response to the trigger. The magnitude of deration is based at least partially on feedback and feedforward analyses of the temperatures of the resistive elements and insulators. The magnitude of deration corresponds to a reduction in retarding capacity of the drivetrain.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
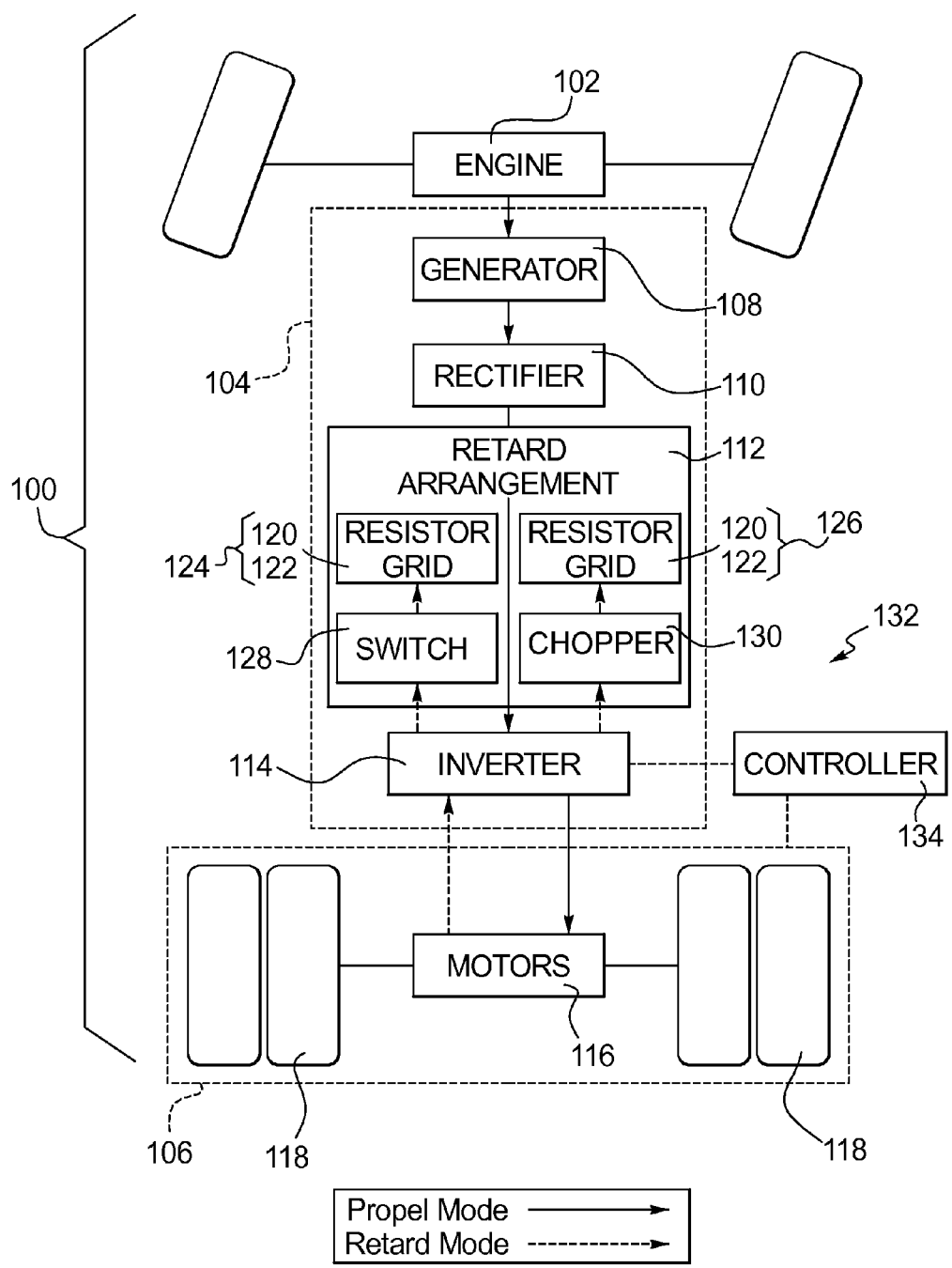
FIG. 1 is a diagrammatic view of an exemplary electric drive machine constructed in accordance with the teachings of the present disclosure.

Referring now to FIG. 1, an exemplary machine 100 that may employ electric drive means for causing movement is diagrammatically illustrated. The machine 100 may be used as a work machine for performing a particular type of operation associated with an industry, such as mining, construction, farming, transportation, or any other suitable industry known in the art. For example, the machine 100 may be an earth moving machine, a marine vessel, an aircraft, a tractor, an off-road truck, an on-highway passenger vehicle, or any other mobile machine. As shown, a typical electric drive machine 100 may essentially include a primary power source 102, an electric drive assembly 104, a drivetrain 106, and the like. The power source 102 may include, for example, a diesel engine, a gasoline engine, a natural gas engine, or any other type of combustion engine commonly used for generating power. The machine 100 may also employ any other suitable source of power such as, for example, a fuel cell, or the like. The electric drive assembly 104 may be configured to essentially manage the power generated by the engine 102 and include a generator 108, a rectifier circuit 110, a retarding grid assembly 112, an inverter circuit 114, and the like. The drivetrain 106 may include one or more traction motors 116 coupled to one or more traction devices or drive wheels 118 for causing movement of the machine 100.

During a propel mode of operation, or when the machine 100 is being accelerated, power may be transferred from the engine 102 and toward the drive wheels 118, as indicated by solid arrows, to cause movement. Specifically, the engine 102 may produce an output torque to the generator 108, which may in turn convert the mechanical torque into electrical power. The electrical power may be generated in the form of alternating current (AC) power. The AC power may then be converted to direct current (DC) by the rectifier circuit 110, and converted again to the appropriate amount of AC power by the inverter circuit 114. The resulting AC power may be used to drive the traction motors 116 and the associated drive wheels 118, as is well known in the art.

During a retarding mode of operation, power may be generated by the mechanical rotation at the drive wheels 118 and directed toward the retarding grid assembly 112, as indicated by dashed arrows. In particular, the kinetic energy of the moving machine 100 may be converted into rotational power at the drive wheels 118. Rotation of the drive wheels 118 may further rotate the motors 116 so as to generate electrical power, for example, in the form of AC power. The inverter circuit 114 may serve as a bridge to convert the power supplied by the motors 116 into DC power. Dissipation of the DC power generated by the motors 116 may produce a counter-rotational torque at the drive wheels 118 to decelerate the machine 100. Such dissipation may be accomplished by passing the generated current provided by the inverter circuit 114 through a substantial electrical resistance provided by the retarding grid 112. Excess heat generated at the retarding grid 112 may be expelled passively or actively, for example, using a blower, or the like.

Still referring to FIG. 1, the retarding grid 112 may include a plurality of resistive elements 120 and insulators 122 configured to absorb the electrical energy provided by the machine 100 during a retarding mode of operation and dissipate the electrical energy in the form of thermal energy. More specifically, the retarding grid 112 may include a first retarding grid 124 and a second retarding grid 126, each having an independently controlled array of resistive elements 120 and insulators 122. For instance, the resistive elements 120 of the first retarding grid 124 may be configured to receive current from the inverter circuit 114 via one or more switches, or a contactor circuit 128. The insulators 122 of the first retarding grid 124 may serve to receive any heat being radiated from the resistive elements 120. When the contactor circuit 128 is closed, the electrical power corresponding to the current generated by the motors 116 may at least partially pass through the first retarding grid 124 and be dissipated as heat. The resistive elements 120 and insulators 122 of the second retarding grid 126 may similarly be configured to receive electrical power via a chopper circuit 130 and dissipate excess electrical energy in the form of heat.

As further illustrated in FIG. 1, the electric drive 104 of the machine 100 may be provided with an electrical retarding deration system 132 having at least a controller 134 that is in electrical communication with the inverter circuit 114. Moreover, through its control of the inverter circuit 114, the controller 134 may adjustably control the magnitude of power that is communicated from the drivetrain 106 to the retarding grid 112 during a retarding mode of operation, and thus, reduce the overall retarding capacity of the drivetrain 106. The controller 134 may be embedded or integrated into the controls of the machine 100 and implemented using one or more of a processor, a microprocessor, a controller, a microcontroller, an electronic control module (ECM), an electronic control unit (ECU), or any other suitable means for electronically controlling functionality of the machine 100. The controller 134 may further be configured to operate according to a predetermined algorithm or set of instructions for controlling the retarding grid 112 and deration thereof via the inverter circuit 114 and based on the various operating conditions of the machine 100. Such an algorithm or set of instructions may be read into or incorporated into a memory of the controller 134.

Figure 2:
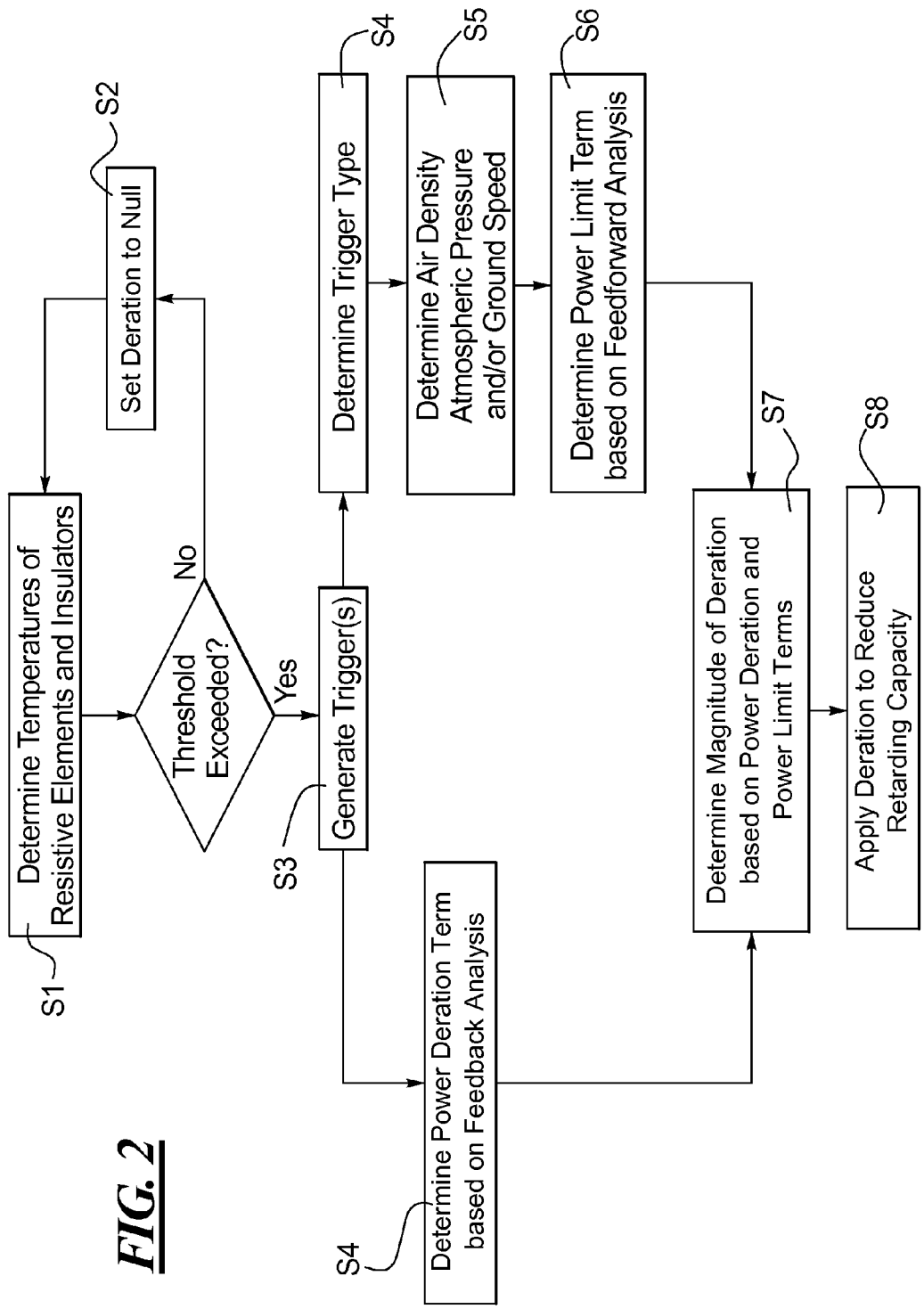
FIG. 2 is a flow diagram of a method of derating a retarding grid of an electric drive machine.

Turning to FIG. 2, an exemplary method or algorithm by which such a controller 134 may manage the deration of a retarding grid 112 is provided. In general, the method of FIG. 2 may configure the controller 134 to continuously monitor the temperatures of the retarding grid assembly 112 during normal operations of the machine 100 and to reduce the retarding capacity of the drivetrain 106 if the temperatures of the retarding grid 112 approach a potential overheating condition. As shown in FIG. 2, the controller 134 may initially determine the temperatures of the resistive elements 120 and insulators 122 of each of the first and second retarding grids 124, 126 in step S1. The temperatures of the resistive elements 120 and insulators 122 may then be compared with predefined temperature threshold values corresponding to the resistive elements 120 and insulators 122. As the thermal characteristics of resistive elements 120 and insulators 122 may vary, the temperature thresholds may include a first predefined threshold value corresponding to the resistive elements 120 and a second predefined threshold value corresponding to the insulators 122 of each retarding grid 124, 126. If the temperatures of the resistive elements 120 and insulators 122 are within an acceptable operating range, the controller 134 may simply maintain or reset the magnitude of deration to be applied to the retarding grid 112 to a null value in step S2, and thus, enable the drivetrain 106 to retard at full capacity. However, if any one of the temperatures of the resistive elements 120 and insulators 122 exceeds its respective threshold, the controller 134 may generate one or more triggers in a step S3.

Once a trigger is generated, the controller 134 may determine a power deration term in a step S4 based on feedback analysis of the temperatures of the resistive elements 120 and insulators 122. The power deration term may correspond to a measure of deration that is required to prevent further temperature increases in the retarding grids 124, 126. For instance, the power deration term may enable the controller 134 to increase the deration amount based on the degree by which the temperature thresholds are exceeded. Furthermore, if a trigger is generated, the controller 134 may also perform feedforward analysis so as to determine a power limit term, as in steps S4-S6 of FIG. 2. The power limit term may correspond to the total amount of power that is allowed to be transmitted to the retarding grids 124, 126. For instance, the power limit term may enable the controller 134 to slow the rise of the temperatures of the retarding grids 124, 126 by rapidly reducing the retarding capacity of the retarding grid assembly 112. In step S4, the controller 134 may determine whether the trigger was generated in response to overheating of a resistive element 120 or in response to overheating of an insulator 122. The controller 134 may further calculate or determine air density, the atmospheric pressure, ground speed, or any other information relating to the operating conditions of the machine 100 in step S5. Based on the trigger type and one or more operating conditions of the machine 100, the controller 134 may generate the appropriate power limit term in step S6. The controller 134 may then determine a magnitude of deration to be applied to the retarding assembly 112 based on both of the power deration and power limit terms in step S7. Subsequently in step S8, through its control of the inverter circuit 114, the controller 134 may limit the amount of power that is transmitted to the retarding grid 112 from the drivetrain 106, in accordance with the magnitude of deration determined in step S7.

Figure 3A:
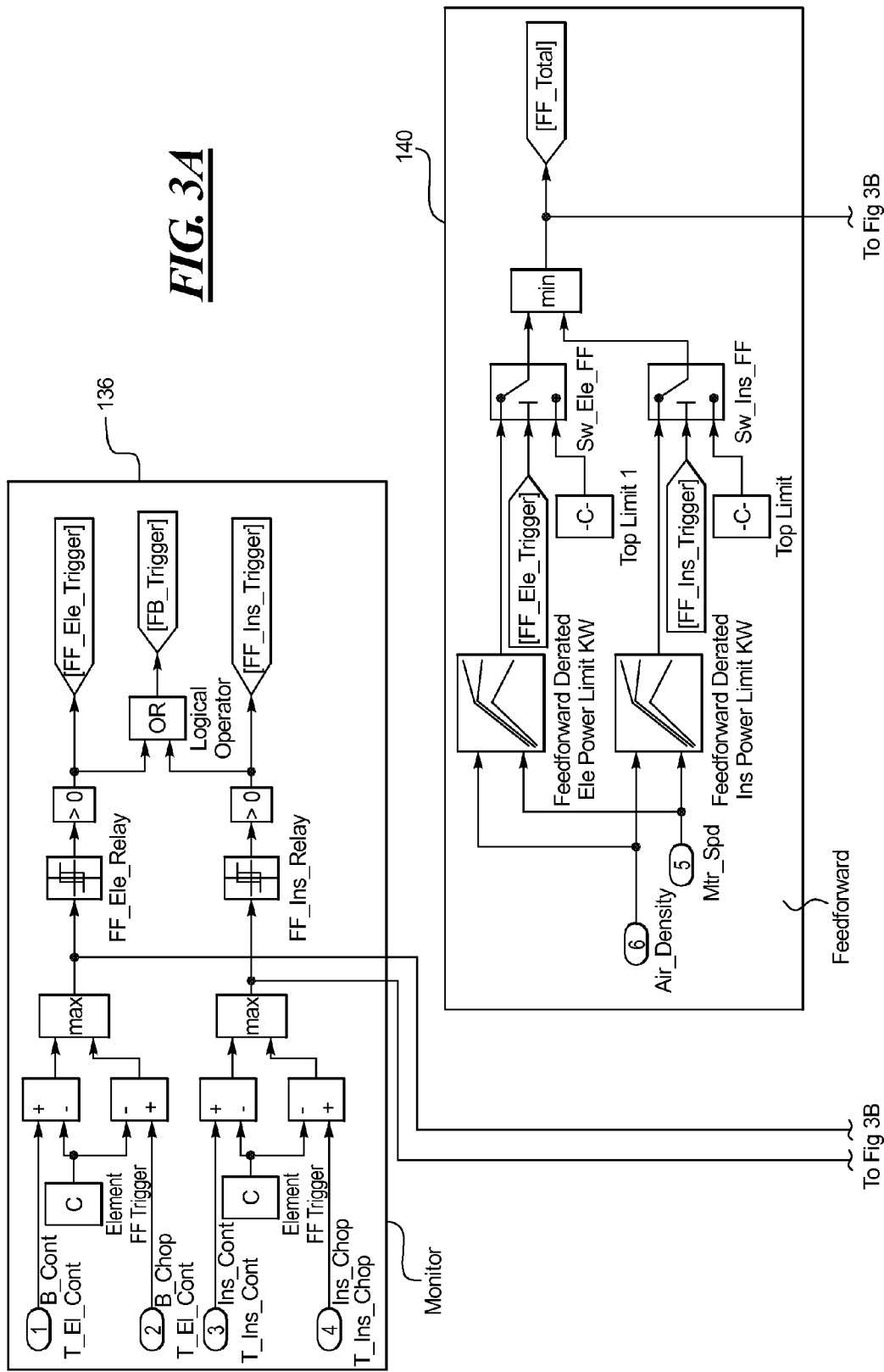
FIG. 3 is a schematic view of a deration control strategy as applied to a typical electric drive machine.
Figure 3B:
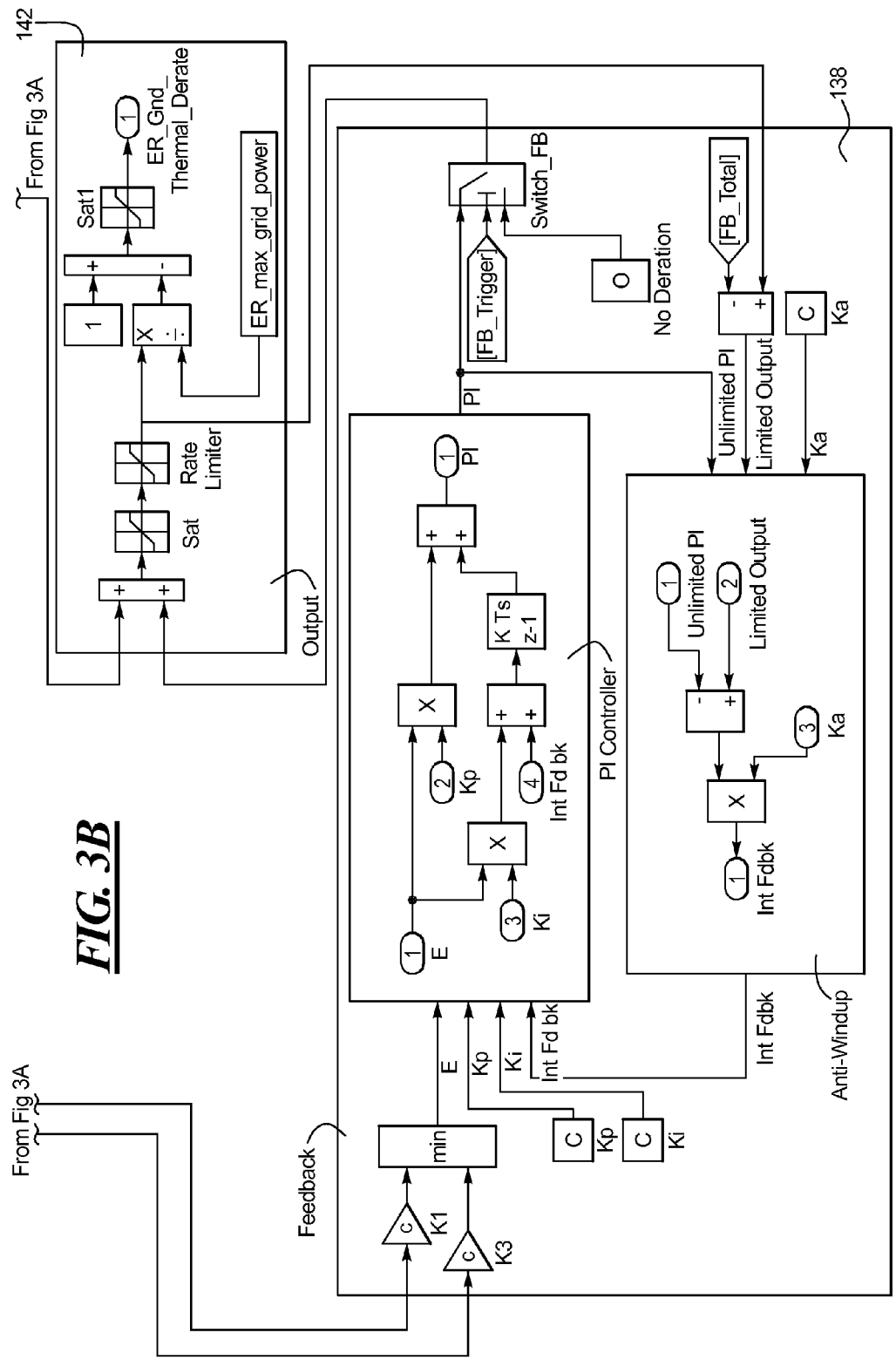

Referring now to FIG. 3, a more detailed schematic of an exemplary deration system 132, or more particularly, a controller 134 of a deration system 132, is provided. As shown, the deration controller 134 may generally be comprised of a monitor module 136, a feedback module 138, a feedforward module 140, an output module 142, and the like. The monitor module 136 may be configured to continuously monitor the temperatures of the resistive elements 120 and insulators 122 of each of the first and second retarding grids 124, 126 for any potential overheating conditions. More specifically, the temperatures of the resistive elements 120 and insulators 122 may be compared with respective thresholds that are predefined within the controller 134. The thresholds may include a first threshold value to be compared with the temperature of the resistive elements 120 and a second threshold value to be compared with the temperature of the insulators 122. The threshold values may be predefined constants or dynamically derived based on immediate operating conditions of the machine 100, and the like. Furthermore, the temperatures of the resistive elements 120 and insulators 122 may be provided by a preprogrammed grid thermal model, or the like, which maps the expected temperatures of the resistive elements 120 and insulators 122 based on various operating conditions of the machine 100. If the temperatures of the resistive elements 120 and insulators 122 determined by the monitor module 136 are all within the acceptable limits and do not exceed their respective thresholds, the controller 134 may determine that no deration is needed. However, if any one of the temperatures of the resistive elements 120 and insulators 122 exceeds the respective threshold, the controller 134 may determine that deration is required to reduce the retarding capacity of the drivetrain 106, and thus, generate a trigger corresponding thereto. The monitor module 136 may provide more than one trigger. For instance, as shown in FIG. 3, the monitor module 136 may generate a trigger that corresponds to potential overheating of the resistive elements 120, a trigger that corresponds to potential overheating of the insulators 122 and/or a trigger that corresponds to potential overheating of any one or more of the resistive elements 120 and insulators 122.

In response to one or more triggers generated by the monitor module 136, the feedback module 138 may perform feedback analysis on the temperatures of the resistive elements 120 and insulators 122 so as to determine a power deration term. As in step S4 of FIG. 2, based on the degree by which the temperature thresholds are exceeded, the feedback module 138 may determine the appropriate power deration term or degree of deration that is required. As shown in FIG. 3, for example, the feedback module 138 may accomplish this using proportional-integral control 144, or any other suitable feedback control commonly used in the art. The feedback module 138 may further include an anti-windup control 146 so as to compensate for any saturation that may occur during the feedback analysis. The feedforward module 140 may further respond to one or more of the triggers generated by the monitor module 136 by performing a feedforward analysis. Moreover, as in steps S4-S6 of FIG. 2, the feedforward module 140 may determine a power limit term based on the type of trigger that was generated, the temperatures of the resistive elements 120 and insulators 122, air density, atmospheric pressure and/or the ground speed associated with the machine 100. The output module 142 of FIG. 3 may receive the power deration and power limit terms determined by the feedback and feedforward modules 138, 140, respectively. As shown, the output module 142 may further combine or sum the power deration and power limit terms so as to result in a total deration term, or a magnitude of deration to be applied to the retarding grid assembly 112. Moreover, the resulting magnitude of deration may be interpreted by the controller 134 as the amount by which to limit the power that is allowed to pass through the inverter circuit 114 and to the retarding grids 124, 126.

INDUSTRIAL APPLICABILITY

In general, the foregoing disclosure finds utility in various industrial applications, such as the construction and mining industry, in minimizing overheating conditions in the retarding grid assemblies of work vehicles and/or machines, such as backhoe loaders, compactors, feller bunchers, forest machines, industrial loaders, skid steer loaders, wheel loaders, and the like. One exemplary machine suited to use of the disclosed systems and methods is a large off-highway truck, such as a dump truck. Exemplary off-highway trucks are commonly used in mines, construction sites and quarries. The off-highway trucks may have payload capabilities of 100 tons or more and travel at speeds of 40 miles per hour or more when fully loaded.

Such work trucks or machines must be able to negotiate steep inclines and operate in a variety of different environments. In such conditions, these machines must frequently enter into a retarding mode of operation for extended periods of time during which the resistive elements and insulators of the associated retarding grids are susceptible to overheating. Although passive and or active cooling measures may be in place to prevent such overheating conditions, such measures may not fully be capable of accurately determining and/or compensating for increases in temperature of the retarding grids. The systems and methods disclosed herein provide further measures for preventing overheating conditions of retarding grids, which may be used as a standalone solution, or in conjunction with passive and/or active grid cooling systems.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A method of derating a retarding grid assembly of a machine, comprising the steps of:
   determining temperatures of resistive elements and insulators associated with the retarding grid assembly;
   generating a trigger if any one of the temperatures of the resistive elements and insulators exceeds a respective temperature threshold; and
   determining a magnitude of deration to be applied to a drivetrain associated with the machine in response to the trigger, the magnitude of deration being based at least partially on feedback and feedforward analyses of the temperatures of the resistive elements and insulators, the magnitude of deration corresponding to a reduction in retarding capacity of the drivetrain.

2. The method of claim 1, wherein the magnitude of deration is null when all of the temperatures of the resistive elements and insulators are below the respective temperature thresholds so as to enable full retarding capacity of the drivetrain.

3. The method of claim 1, wherein the retarding grid assembly includes a first grid of resistive elements and insulators and a second grid of resistive elements and insulators, the trigger being generated based on the temperatures of the resistive elements and insulators of both first and second grids.

4. The method of claim 1, wherein the temperatures of the resistive elements and insulators are derived using a predefined thermal model of the retarding grid assembly, and the temperature thresholds for the resistive elements and insulators are predefined constant values.

5. The method of claim 1, wherein the trigger includes any one or more of a feedback trigger, a first feedforward trigger and a second feedforward trigger, the feedback trigger corresponding to feedback analysis of the temperatures of the resistive elements and the insulators, the first feedforward trigger corresponding to feedforward analysis of the temperature of the resistive elements, and the second feedforward trigger corresponding to feedforward analysis of the temperature of the insulators.

6. The method of claim 1, wherein the feedback analysis determines a power deration term based on the temperatures of the resistive elements and insulators, and the feedforward analysis determines a power limit term based on the temperatures of the resistive elements and insulators as well as one or more of air density, atmospheric pressure and ground speed.

7. The method of claim 1, wherein the feedback analysis is configured to continuously update the magnitude of deration based on subsequent changes in the temperatures of resistive elements and insulators.

8. A method of derating a retarding grid assembly of a machine, comprising the steps of:
   determining temperatures of resistive elements and insulators associated with the retarding grid assembly;
   generating a trigger if any one of the temperatures of the resistive elements and insulators exceeds a respective temperature threshold;
   determining a power deration term in response to the trigger, the power deration term being based at least partially on feedback analysis of the temperatures of the resistive elements and insulators;
   determining a power limit term in response to the trigger, the power limit term being based at least partially on feedforward analysis of the temperatures of the resistive elements and insulators; and
   determining a deration factor based on the power deration and power limit terms, the deration factor corresponding to a reduction in retarding capacity of a drivetrain associated with the machine.

9. The method of claim 8, wherein the deration factor is determined by summing the power deration and power limit terms.

10. The method of claim 8, wherein the power limit term is further based on one or more of air density, atmospheric pressure and ground speed.

11. The method of claim 8, wherein the feedback analysis employs proportional-integral and anti-windup control in determining the power deration term.

12. The method of claim 8, wherein the power deration term is determined independently of the power limit term.

13. An electrical retarding deration system for a machine having at least a retarding grid assembly and a drivetrain, the deration system comprising:
   an inverter circuit configured to communicate power between the drivetrain and the retarding grid assembly; and
   a controller electrically coupled to the inverter circuit and configured to adjust a magnitude of the power communicated to the retarding grid assembly based on temperatures of resistive elements and insulators of the retarding grid assembly, the controller configured to generate a trigger if any one of the temperatures of the resistive elements and insulators exceeds a respective temperature threshold, and determine a magnitude of deration to be applied to the drivetrain in response to the trigger, the magnitude of deration being based at least partially on feedback and feedforward analyses of the temperatures of the resistive elements and insulators, the magnitude of deration corresponding to a reduction in retarding capacity of the drivetrain.

14. The system of claim 13, wherein the retarding grid assembly includes a first grid being enabled by a contactor circuit and a second grid being enabled by a chopper circuit, the controller being configured to selectively enable each of the contactor and chopper circuits through the inverter circuit and generate the trigger based on the temperatures of the resistive elements and insulators of both first and second grids.

15. The system of claim 13, wherein the controller is configured to determine the temperatures of the resistive elements and insulators using a thermal model of the retarding grid system that is preprogrammed into the controller.

16. The system of claim 13, wherein the controller is configured to determine a power deration term based on feedback analysis of the temperatures of the resistive elements and insulators, and determine a power limit term based on feed-forward analysis of the temperatures of the resistive elements and insulators.

17. The system of claim 16, wherein the controller is further configured to determine the power limit term based on one or more of air density, atmospheric pressure and ground speed.

18. The system of claim 16, wherein the controller is configured to employ proportional-integral and anti-windup control in determining the power deration term.

19. The system of claim 16, wherein the controller is configured to determine the power deration term independently of the power limit term.

20. The system of claim 13, wherein the controller is configured continuously update the magnitude of deration based on changes in the temperatures of resistive elements and insulators.

* * * * *